(12) United States Patent
Kutsche et al.

(10) Patent No.: US 6,364,332 B1
(45) Date of Patent: Apr. 2, 2002

(54) ADJUSTABLE VIBRATION DAMPER WITH SAFETY DEVICE

(75) Inventors: Thomas Kutsche, Schweinfurt; Norbert Heinz, Üchtelhausen; Thomas Manger, Wasserlosen-Kaisten; Joachim Kühnel, Dittelbrunn; Thorsten Asshoff; Steffen Heyn, both of Schweinfurt, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/586,610

(22) Filed: Jun. 2, 2000

(30) Foreign Application Priority Data

Jun. 7, 1999 (DE) .......................... 199 25 724

(51) Int. Cl.[7] .............................................. B60G 11/26
(52) U.S. Cl. .................................................. 280/124.16
(58) Field of Search .................. 280/124.157, 124.158, 280/124.159, 124.16, 6.153, 6.154, 124.161

(56) References Cited

U.S. PATENT DOCUMENTS 2,926,023 A * 2/1960 Kraus
3,112,923 A * 12/1963 Ley
3,232,634 A * 2/1966 Kress
4,238,128 A * 12/1980 McKee
6,196,555 B1 * 3/2001 Gaibler

FOREIGN PATENT DOCUMENTS

DE 2 118 080 10/1972
DE 32 46 962 A1 6/1984
DE 41 05 771 A1 8/1992

* cited by examiner

*Primary Examiner*—Paul N. Dickson
(74) *Attorney, Agent, or Firm*—Cohen, Pontani, Lieberman & Pavane

(57) ABSTRACT

An adjustable vibration damper, having a displacer in a cylinder, a damping medium exerting a damping force via an adjustable damping valve. The adjustable damping valve is activated by a control pressure of a pneumatic spring A safety device is provided which, in the event of a control pressure reduced as a result of damage to the pneumatic spring, provides a sufficiently high damping force of the vibration damper. At least two pneumatic springs are connected to the safety device, which is constructed from a pneumatic circuit functioning as a pressure balance between the pneumatic springs which releases the higher control pressure of a pneumatic spring in the pneumatic circuit. The adjustable vibration dampers which belong to the pneumatic springs are connected via at least one pressure outlet connection of the pneumatic circuit and are activated by the highest control pressure of the pneumatic springs involved.

6 Claims, 4 Drawing Sheets

ADJUSTABLE VIBRATION DAMPER WITH SAFETY DEVICE

BACKGROUND OF THE INVENTION

1. Field of the Invention

The invention relates to an adjustable vibration damper.

2. Discussion of the Prior Art

In adjustable vibration dampers which are used together with pneumatic springs, there is an increasing tendency to utilize the pressure in the pneumatic spring of the vehicle as a control signal for an adjustable damping valve on or in the vibration damper. The essential advantage of these damping valves controllable by air pressure is the simple and therefore also cost-effective design. Particularly in the commercial vehicle sector, the aim is to achieve simple and robust solutions, since the chassis components are exposed to very high loads on off-highway journeys.

Due to the high loads, pneumatic springs may become leaky because of the embrittlement of the pneumatic spring bellows. It must also be taken into account that a pneumatic spring may burst. For the activation of the pneumatic spring, there is the important difference as to whether a low control pressure is present because of a low vehicle load or because of a leak.

For this type of pneumatic spring failure, German reference DE 41 05 771 A1 discloses a solution in which a pneumatic control pressure is used for an adjustable damping valve. A relatively complicated damping valve is employed, in which a control piston is subjected on one side to a control pressure and on the other side to a reference pressure. The atmosphere serves as reference pressure. As soon as the control pressure falls short of a particular level, the reference pressure presses the control piston into an operating position which is linked to a higher damping force for the vibration damper.

SUMMARY OF THE INVENTION

The object of the present invention is to provide an adjustable vibration damper which, when the control pressure fails, can continue to build up a sufficient damping force.

The object is achieved, according to the invention, in that at least two pneumatic springs are connected to the safety device, which is constructed from a pneumatic circuit functioning as a pressure balance between the pneumatic springs which releases the higher control pressure of a pneumatic spring in the pneumatic circuit. The adjustable vibration dampers which belong to the pneumatic springs are connected via at least one pressure outlet connection of the pneumatic circuit and are activated by means of the higher control pressure of the pneumatic springs involved.

The pneumatic circuit represents an interrogation device. It is assumed that the higher control pressure is, under all circumstances, on the safe side of the operation of the pneumatic spring. An intact system can always generate a higher pressure than a defective pneumatic spring. The faulty control pressure is consequently filtered out.

The simplest variant is distinguished in that the pneumatic circuit consists of a shuttle valve which has connections to the pneumatic springs. A shuttle valve known per se may be used. This affords the advantage that two pneumatic springs are protected by means of one shuttle valve.

There may be provision for using the vibration damper in a vehicle axle, the pneumatic springs of a vehicle axle being connected to the pneumatic circuit. This design makes it possible, within limits, to have a beneficial influence on the rolling behavior of a vehicle since all the vibration dampers of a vehicle axle are activated by means of the higher control pressure of the pneumatic spring on the outside of a bend.

Alternatively, the vibration damper may be used in a vehicle having a plurality of pneumatically suspended axles, the pneumatic springs of different axles being connected to the pneumatic circuit. The background to this is the philosophy that one pneumatic spring has burst because of an excessive axle load. The remaining pneumatic spring is consequently subjected to even higher load on this axle, so that the probability of further failure increases. If, however, the control pressure of a pneumatic spring of another axle is used, the adjustable valve of the vibration damper can continue to be operated with a greater degree of safety.

There is also the possibility of using the vibration damper in a vehicle having a plurality of pneumatically suspended axles, the pneumatic springs of a number of axles being connected, in each case per axle, and the pneumatic springs of different axles being connected to the pneumatic circuit. In this case, the pneumatic springs are always compared with one another in pairs and the pneumatic spring released at the time is compared with another released pneumatic spring.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention

DETAILED DESCRIPTION OF THE PREFERRED EMBODIMENTS

Figure 1:
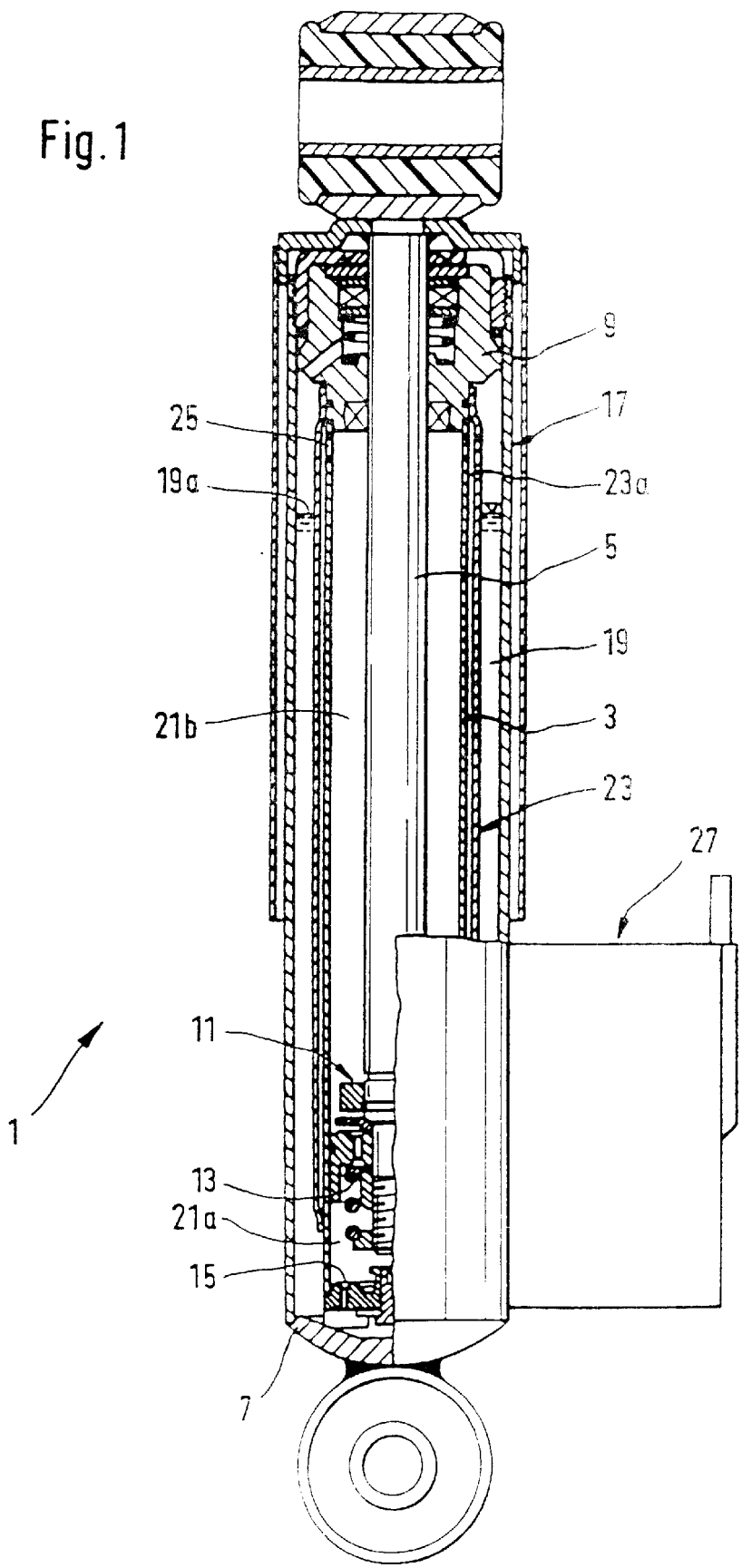
FIG. 1 shows an adjustable vibration damper as an individual component.

FIG. 1 illustrates a vibration damper 1 with a cylinder 3, in which a piston rod 5 is arranged so as to be axially moveable. The cylinder 3 is closed off downward by means of a bottom 7. The piston rod 5 is led out of the upper end of the cylinder through a guiding and sealing unit 9. A piston unit 11 having a piston valve arrangement 13 is fastened to a piston rod 5 within the cylinder 3. The bottom of the cylinder 3 is provided with a bottom valve arrangement 15. The cylinder 3 is encased by a container tube 17. An annular space 19, which constitutes a compensating chamber, is formed between the container tube 17 and the cylinder 1. The space within the cylinder 1 is subdivided by means of the piston unit 11 into a first working chamber 21a and a second working chamber 21b. The working chambers 21a, 21b are filled with pressure liquid. The compensating chamber 19 is filled to the level 19a with liquid and above it with gas. Within the compensating chamber 19, a first line section, specifically a high-pressure subsection 23a, is formed by an intermediate tube 23 and is connected via a bore 25 of the cylinder 1 to the second working chamber 21b. Connected to this high-pressure subsection is a valve 27 which is mounted laterally on the container tube 17 and reacts as a function of pressure. A second line section, specifically a low-pressure subsection, leads (not illustrated) from the valve 27 to the compensating space 19.

When the piston rod 5 is extended upward out of the cylinder 3, the upper working chamber 21b is reduced in size. An excess pressure is formed in the upper working chamber 21b and can be bled into the lower working chamber 21a by means of the piston valve arrangement 13, as long as the valve 27 reacting as a function of pressure is closed. When the valve 27 reacting as a function of pressure is opened, liquid simultaneously flows from the upper working chamber 21b through the high-pressure subsection 23 and the valve 27 reacting as a function of pressure into the compensating chamber 19. The damping characteristic of the vibration damper during the extension of the piston rod 5 is therefore dependent on whether the valve 27 reacting as a function of pressure is open or closed.

When the piston rod 5 is retracted into the cylinder 3, an excess pressure is formed in the lower working chamber 21a. Liquid can pass from the lower working chamber 21a through the piston valve arrangement 13 upward into the upper working chamber 21b. The liquid displaced by means of the increasing piston rod volume within the cylinder 3 is expelled through the bottom valve arrangement 15 into the compensating chamber 19. Since the throughflow resistance of the piston valve arrangement 13 is lower than the throughflow resistance of the bottom valve arrangement 15, a rising pressure likewise occurs in the upper working chamber 21b. With the valve 27 reacting as a function of pressure being open, this rising pressure can, in turn, flow through the high-pressure subsection 23a over into the compensating space 19. This means that, with the valve 27 reacting as a function of pressure being open, the shock absorber has a softer characteristic, even during retraction, and a harder characteristic when the valve 27 reacting as a function of pressure is closed, in exactly the same way as when the piston rod 5 is extended. It should be noted that the direction of flow through the high-pressure subsection 23a of the bypass is always the same, irrespective of whether the piston rod 5 is retracted or extended.

Figure 2:
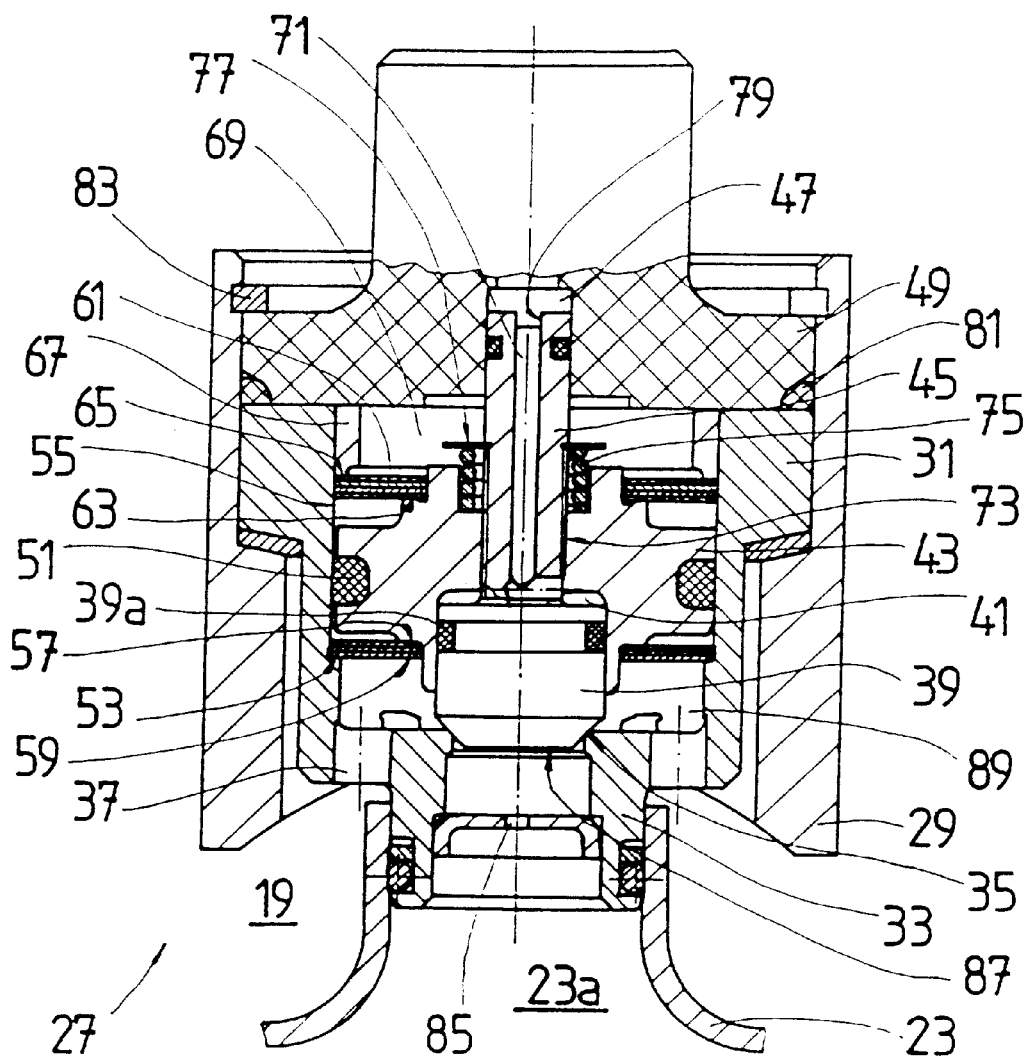
FIG. 2 shows an exemplary embodiment of the adjustable valve on the vibration damper.

FIG. 2 shows an embodiment of the pressure-dependent valve 27 as an individual component. Mounted within a tubular connection piece 29 arranged on the outside of the container tube 17 is a pot-shaped insert 31 which has a connection 33 to the high-pressure subsection 23a (see also FIG. 1) of the vibration damper 1. A valve surface 35 and at least one outflow orifice 37 to the compensation space 19 are worked in on the bottom of the pot-shaped insert 31.

In this operating position, a valve body 39 is prestressed on the valve surface. The valve body 39 is guided radially in a central stepped orifice 41 of a pressure intensifier 43, a valve body seal 39a separating the valve body front side from the valve body rear side. The valve body 39 has adjoining it a prolongation 45 which passes completely through the pressure intensifier 43 and ends in a cover 49 in a pressure connection orifice 47. The pressure connection orifice 47 is connected to a pneumatic spring not illustrated (see FIG. 3 or 4).

The pressure in the pressure connection orifice 47, referred to below as control pressure, acts on the pressure intensifier 43, which is guided in an axially floating manner in the pot-shaped insert 31. The pressure intensifier is formed by a disk which carries a seal 51 at its outside diameter. For this purpose, the inside diameter of the tubular insert is fashioned, starting from the cover 49 as far as a first supporting surface 53, as a guide surface 55.

A first spring element 59, which consists preferably of layered flat disks, is arranged on the first supporting surface 53, radially on the outside, and on a shoulder 57 on the underside of the pressure intensifier 43. A second spring element 61 is braced between a further shoulder 63 of the pressure intensifier 43 and a second supporting surface 65. The second supporting surface 65 is provided by a tension ring 67, of which the outside diameter relative to the guide surface 55 is dimensioned in such a way that there is a press fit between these surfaces.

Starting from the seal 51, the guide surface 55 forms, with the top side of the pressure intensifier 43 and the cover 49, a pressure space 69, in which the control pressure prevails. The control medium does not pass directly from the pressure connection orifice 47 into the pressure space 69 since the prolongation 45 is sealed off on the outside relative to the pressure connection orifice 47. The prolongation 45 has a central throttling inflow duct 71 which reaches approximately as far as the valve body. The pressure medium can flow from there through the slight gap between the pressure intensifier 43 and the prolongation 45 as far as a threaded connection which forms a setting device 73. The threaded connection constitutes a continuation of the throttling inflow duct 71.

So that the setting device 73 or the threaded connection operates without any play, a prestressing spring 75 is arranged between the prolongation 45 and the top side of the pressure intensifier 43 and prestresses the two components 45, 43 of the threaded connection in such a way that the same thread flanks are always in engagement. A supporting disk 77 serves as an abutment for the prestressing spring 75.

A cover seal 81 is intended to seal off the pressure space 69 and the compensating space 19 relative to the surroundings in the region of the valve 27. A retaining ring 83 holds the cover 49 in the closed position, the cover 49 being rotatable so that a supply line, not illustrated, can be oriented into a desired position relative to the valve 27.

While the damper is in operation, damping liquid is displaced via the high-pressure subsection 23a into the connection 33 of the valve 27. Depending on the desired damping force characteristic, the damping medium must, if appropriate, pass through a prethrottle 85, before it strikes an onflow surface 87 of the valve body 39. The pressure on the onflow surface 87, multiplied by its area, constitutes an opening force which takes effect on the valve body 39 and acts counter to the resulting closing force consisting of the control pressure in the pressure space 69 on the pressure intensifier 43 and the resulting spring force of the two spring elements 59; 61. When the opening force is greater than the closing force, the valve body 39 lifts off or an already opened valve body, which in the pressureless state already allows a valve passage cross section, lifts off further. The damping medium can flow out via the outflow orifices 37 into the compensating space 19 from a low-pressure space 89 between the bottom of the pot-shaped insert 31 and the underside of the pressure intensifier 43. Due to the pressure drop of the damping medium at the valve 27, a damping force is established which can be set by means of the magnitude of the control pressure.

It should also be mentioned that, when there is no piston movement taking place, the instantaneous pressure in the vibration damper acts on the surface consisting of the size of the underside of the pressure intensifier, plus the onflow surface 87 of the valve body 39, and constitutes an opening force. Particularly in vibration dampers with gas pressurization in the compensation space, this fact must be taken into account in setting the spring elements, since, in the event of heating, for example due to damping operation, gas pressurization may rise, with the result that, by virtue of the greater opening force, the valve body sets a larger valve passage cross section and the damping force falls correspondingly.

This design of the vibration damper and of the adjustable valve connected to it is to be seen as an example. It is intended merely to illustrate the operation of a pneumatically activated valve. In principle, the adjustable valve may also be designed differently. A piston arrangement is also possible.

Figure 3:
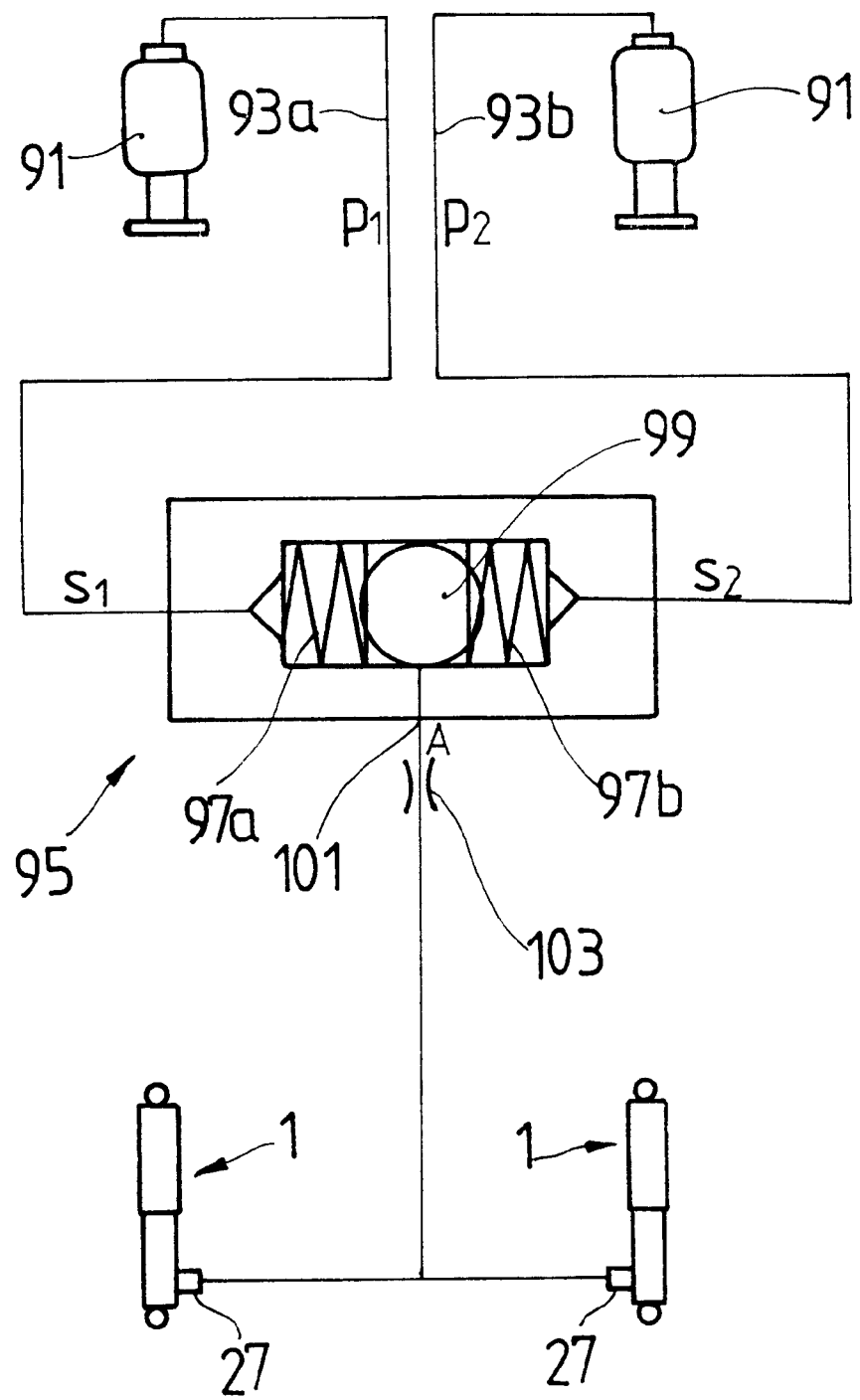
FIG. 3 shows a safety device for two adjustable vibration dampers.

FIG. 3 shows a circuit diagram which contains two pneumatic springs 91 with two adjustable vibration dampers 1. The vibration dampers 1 may be arranged on one vehicle axle, but also on different vehicle axles. The illustration of the compressed air supply device has been dispensed with for the sake of clarity.

The design of a pneumatic spring 91 is presumed to be known. Reference is made, for example, to German reference DE 32 46 962 A1. It is also possible, however, for the pneumatic spring and the vibration damper to form a structural unit, as is already known from German reference DE 21 18 080 A1.

Connected in each case to the pneumatic spring is a control line 93*a*; 93*b*, that transmits the air pressure $p_1$; $p_2$ to a connection $S_1$; $S_2$ of a safety device 95. This safety device is a shuttle valve which releases the higher of the two control pressures $p_1$; $p_2$, in that a valve body 99 held in an initial position by springs 97*a*; 97*b* opens a pressure outlet connection 101 to the vibration dampers 1. The safety device may also be followed by a throttle 103 which filters out pneumatically an undesirably high pressure change frequency.

While the pneumatic springs 91 are in operation, they are kept constantly under pressure by the pressure supply device. If it is assumed that both pneumatic springs are supplied uniformly with compressed air, the safety device 95 or the valve body 99 assumes the switching position illustrated, in which both control connections $s_1$; $s_2$ are released and the control pressure of both pneumatic springs 91 acts on the adjustable valve 27 of the vibration dampers 1.

As soon as a control line 93*a*; 93*b* and also the pneumatic spring 91 has a defect linked to a pressure loss at the control connection $s_1$; $s_2$, the valve body 99 of the safety device 95 is brought, by the higher pressure within the intact pneumatic spring, into a switching position in which the control connection having the pressure loss is shut off. Both vibration dampers are consequently supplied with a control pressure by the intact pneumatic spring.

Figure 4:
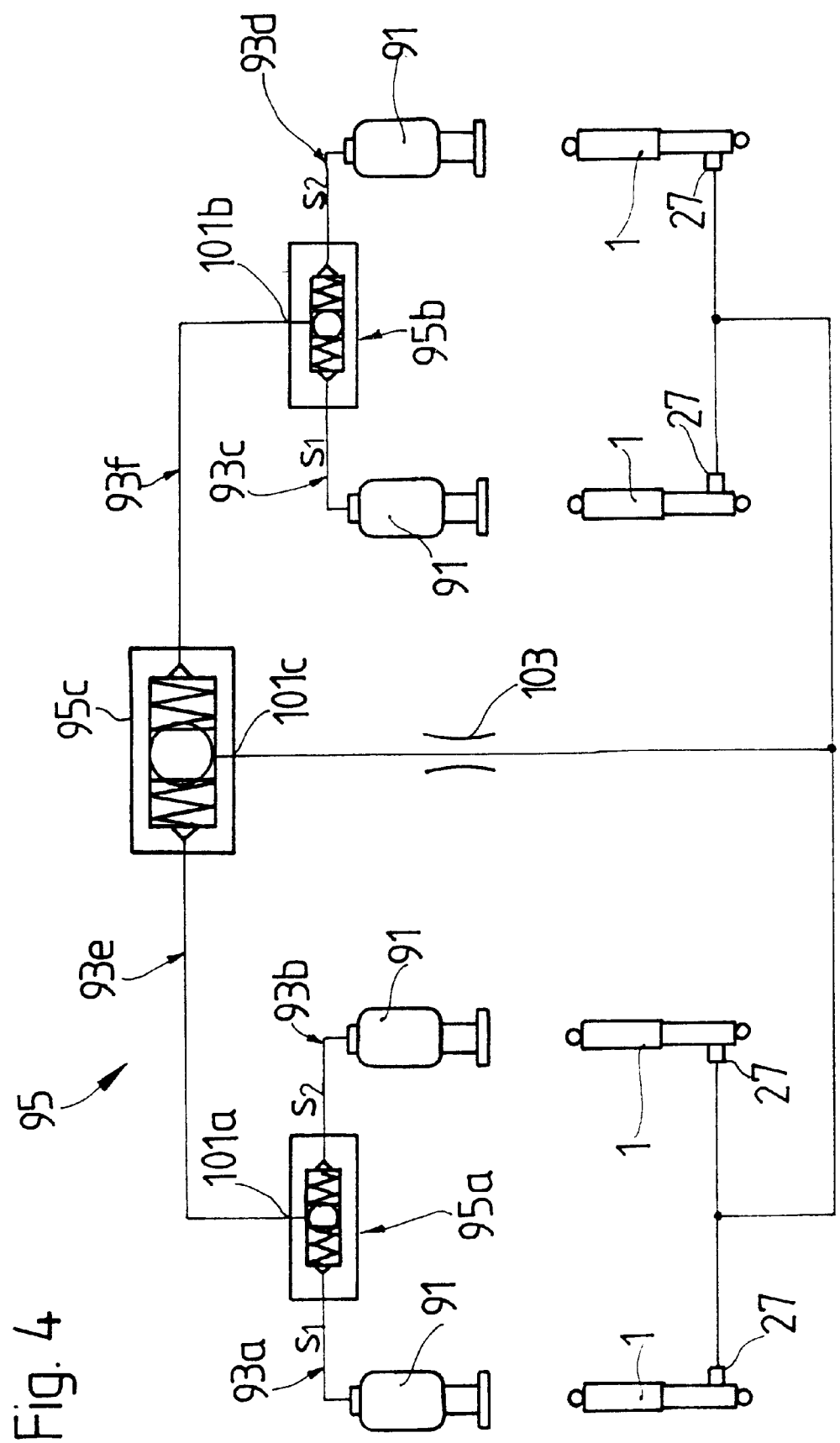
FIG. 4 shows a multiaxle pneumatically suspended vehicle with a safety device for all the adjustable valves of the vibration dampers.

FIG. 4 shows a variation of the version according to FIG. 3. In this case, the safety device consists of 3 shuttle valves 95*a*; 95*b*; 95*c* which are interlinked to form a logic circuit. Basically, according to the principle of FIG. 3, two pneumatic springs 91 are connected to one shuttle valve 95*a*; 95*b* via control lines 93*a*; 93*b*; 93*c*; 93*d*. These shuttle valves 95*a*; 95*b* are, in turn, connected to a central shuttle valve 95*c* by means of further control lines 93*e*; 93*f*, so that, for example, the pneumatic springs of a first vehicle axle are compared with pneumatic springs of a second vehicle axle on the principle of the pressure balance, the higher pressure of the control connections always prevailing at the pressure outlet connection 101*c* and activating all the vibration dampers 1.

The invention is not limited by the embodiments described above which are presented as examples only but can be modified in various ways within the scope of protection defined by the appended patent claims.

We claim:

1. An adjustable vibration damper, comprising: a cylinder; a displacer in the cylinder; an adjustable damping valve operative to cause a damping medium to exert a damping force; at least two pneumatic springs operatively connected to the adjustable damping valve so as to activate the damping valve with a control pressure from the pneumatic springs; and a safety device operative in the event of a control pressure reduced as a result of damage to any of the pneumatic springs to provide a sufficiently high damping force of the vibration damper, the two pneumatic springs being connected to the safety device in a pneumatic circuit so that the safety device functions as a pressure balance between the pneumatic springs which releases a higher control pressure of a pneumatic spring in the pneumatic circuit, the adjustable vibration damper which belongs to the pneumatic spring being connected via at least one pressure outlet connection of the pneumatic circuit and being activated by means of a highest control pressure of the pneumatic springs involved.

2. An adjustable vibration damper as defined in claim 1, wherein the pneumatic circuit includes a shuttle valve which has connections to the pneumatic springs.

3. An adjustable vibration damper as defined in claim 1, wherein the vibration damper is useable in a vehicle axle, the pneumatic springs of the vehicle axle being connected to the pneumatic circuit.

4. An adjustable vibration damper as defined in claim 1, wherein said vibration damper is useable in a vehicle having a plurality of pneumatically suspended axles, the pneumatic springs of different axles being connected to the pneumatic circuit.

5. An adjustable vibration damper as defined in claim 1, wherein said vibration damper is useable in a vehicle having a plurality of pneumatically suspended axles, the pneumatic springs of a number of axles being connected, in each case per axle, and said pneumatic springs of different axles being connected to the pneumatic circuit.

6. A combination, comprising: adjustable vibration dampers each comprised of a cylinder, a displacer in the cylinder, a damping medium that exerts a damping force via an adjustable damping valve, at least two pneumatic springs operative to exert a control pressure for activating the adjusting damping valve; and a safety device operative to provide a sufficiently high damping force of the vibration damper in the event of a control pressure reduction due to damage to the pneumatic springs, the two pneumatic springs being connected to the safety device, the safety device being constructed from a pneumatic circuit functioning as a pressure balance between the pneumatic springs so as to release a higher control pressure of a pneumatic spring in the pneumatic circuit, the adjustable vibration dampers which belong to the pneumatic springs being connected via at least one pressure outlet connection of the pneumatic circuit and being activated by means of a highest control pressure of the pneumatic springs.

* * * * *